United States Patent

[11] 3,539,099

| [72] | Inventor | Friedrich Grohe<br>Hemer, Germany |
|---|---|---|
| [21] | Appl. No. | 727,755 |
| [22] | Filed | May 8, 1968 |
| [45] | Patented | Nov. 10, 1970 |
| [73] | Assignee | Firma Friedrich Grohe Armaturenfabrik<br>Hemer, Germany |

[54] THERMOSTAT CONTROLLED MIXING FAUCET
14 Claims, 2 Drawing Figs.

[52] U.S. Cl.................................................. 236/12,
137/99; 236/93
[51] Int. Cl.......................................... G05d 23/13,
G05d 11/16
[50] Field of Search........................................... 236/12,
12(A), 93; 137/99

[56] References Cited
UNITED STATES PATENTS

| 2,609,146 | 9/1952 | Heikes.......................... | 236/12 |
| 2,657,860 | 11/1953 | Schmidt et al................ | 137/99X |
| 3,004,710 | 10/1961 | Couffer et al................. | 236/12 |
| 3,028,094 | 4/1962 | Burhop......................... | 236/12 |
| 3,388,861 | 6/1968 | Harding....................... | 236/12 |
| 2,893,637 | 7/1959 | Trubert........................ | 236/80X |
| 3,338,516 | 8/1967 | Parr............................. | 236/80 |

*Primary Examiner*—William E. Wayner
*Attorney*—Michael S. Striker

ABSTRACT: A mixer valve unit can be inserted into the housing of a hot and cold water mixing faucet in a position engaged and operated by a thermostat to vary the relative amount of hot and cold water in accordance with the temperature of the mixed water, and can be removed and replaced through an opening in the housing.

Patented Nov. 10, 1970

INVENTOR
FRIEDRICH GROHE
BY
*Michael S. Striker*
ATTORNEY 3,539,099

THERMOSTAT CONTROLLED MIXING FAUCET

BACKGROUND OF THE INVENTION

Thermostat controlled mixing faucets are known in which hot and cold water is mixed to obtain a mixture having a desired temperature.

In order to hold the temperature of the mixed water constant, and to equalize pressure fluctuations in the hot and cold water lines, a thermostat controlled valve, pressure equalizing pistons, and check valves are required so that servicing and replacement of parts is complicated and time consuming, even for a skilled plumber.

SUMMARY OF THE INVENTION

It is one object of the invention to overcome the disadvantages of known thermostat controlled mixing faucets, and to provide a mixer valve unit which can be inserted into, and removed from the housing of the mixing faucet in an easy operation.

Another object of the invention is to provide a mixer valve unit including check valves, pressure equalizing pistons and a slide valve, and being adapted to be inserted into a mixer valve housing in a position located between the inlet and outlet ports of the same, in which position the valve slide is engaged by the actuating means of the thermostat in the housing of the mixing faucet.

Another object of the invention is to provide an exchangeable mixer valve unit which is adapted to cooperate with any type of thermostat provided in a mixing faucet.

One embodiment of the invention comprises a mixer valve unit which is located between the hot and cold water inlet ports and the mixed water outlet port of the housing of a mixing faucet, and has a movable valve means operated by a thermostat for regulating the amounts of hot and cold water which are mixed. Mounting means support the valve unit in the housing of the mixing faucet for removal and insertion through an opening in the same, and a cover closes the opening during normal operations of the mixing faucet but can be removed for removal or insertion of the valve unit.

The mixer valve unit is symmetrically constructed as a cylindrical body having inlet means for hot and cold water at the ends, and outlet means for hot and cold water in the central portion on which a tubular valve slide, operated by the thermostat of the mixing faucet, slides for opening one of the outlet means when closing the other and vice versa. The inlet means are provided with check valves, and within the cylinder body of the mixer valve unit, equalizing piston means are mounted by which rapid pressure fluctuations are compensated. The cylinder means of the mixer valve unit are preferably constructed of three parts including a center portion in which the equalizing piston means are mounted and two cap portions which are secured to the center portion of the cylinder means and are formed with the inlet means for hot and cold water.

The inlet means for hot and cold water, respectively, communicate through slots in the cylinder means with outlets for hot and cold water whose opening is controlled by the valve slide which is reciprocated by the thermostat.

In the preferred embodiment of the invention, the housing of the mixing faucet has aligned bores in which corresponding surface portions of the end caps of the cylinder means are located. A stepped shoulder is provided for limiting movements of the valve unit in the bore in one direction, and the valve unit is held in place by a cover screwed into the opening through which it was inserted into the housing.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENT

Figure 2:
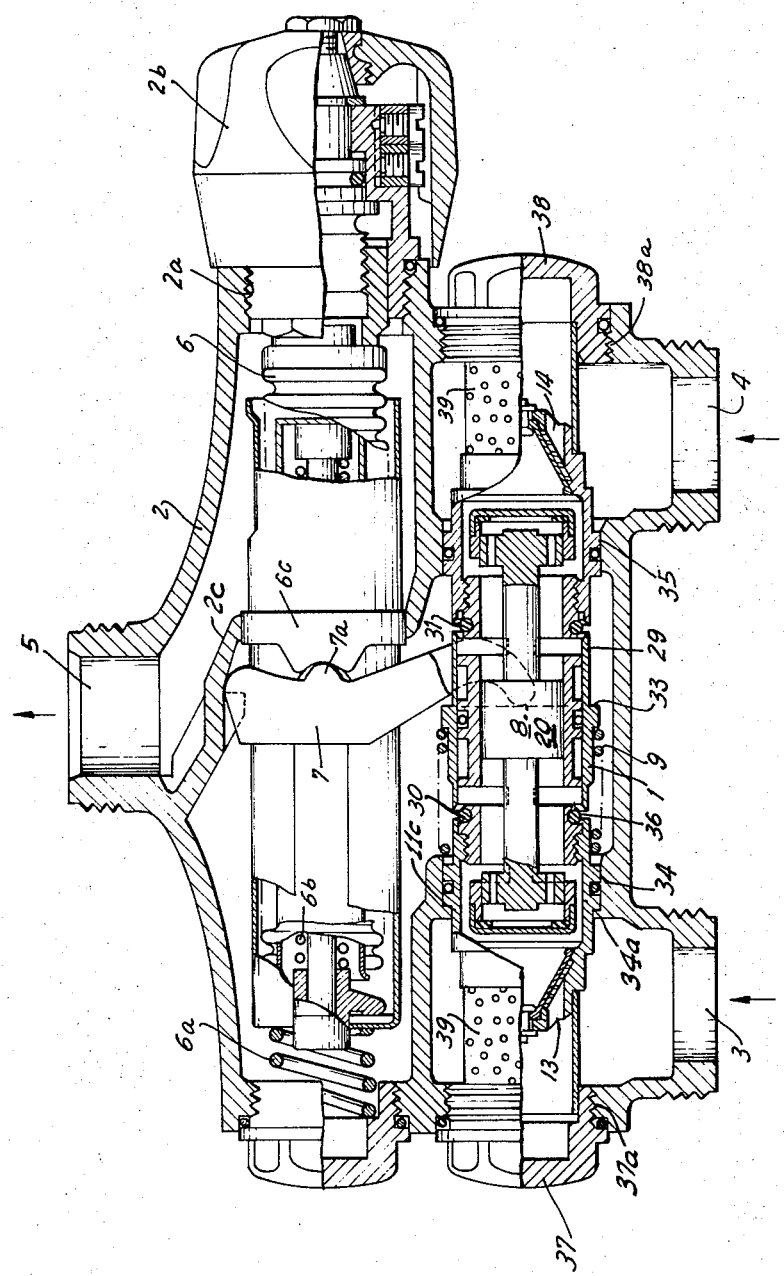
FIG. 2 is an axial sectional view illustrating a mixer faucet provided with the mixer valve unit shown in FIG. 1, and having mounting means for removably supporting the unit.

As shown in FIG. 2, the housing 2 of a mixing faucet has inlet ports 3 and 4 for hot and cold water, and an outlet port 5 for mixed water. A thermostat 6 has a tubular corrugated casing filled with an expansible liquid which responds to different temperatures of the mixed water in the inner cavity of housing 2 to expand against the action of a spring 6a, or to contract when the temperature of the water drops. Spring means 6b are provided within the thermostat casing, which can be removed through an assembly aperture 2a in housing 2 which is normally closed by a cap 2b having a portion threaded into the opening 2a. The above-described construction is well known and not an object of the invention.

Figure 1:
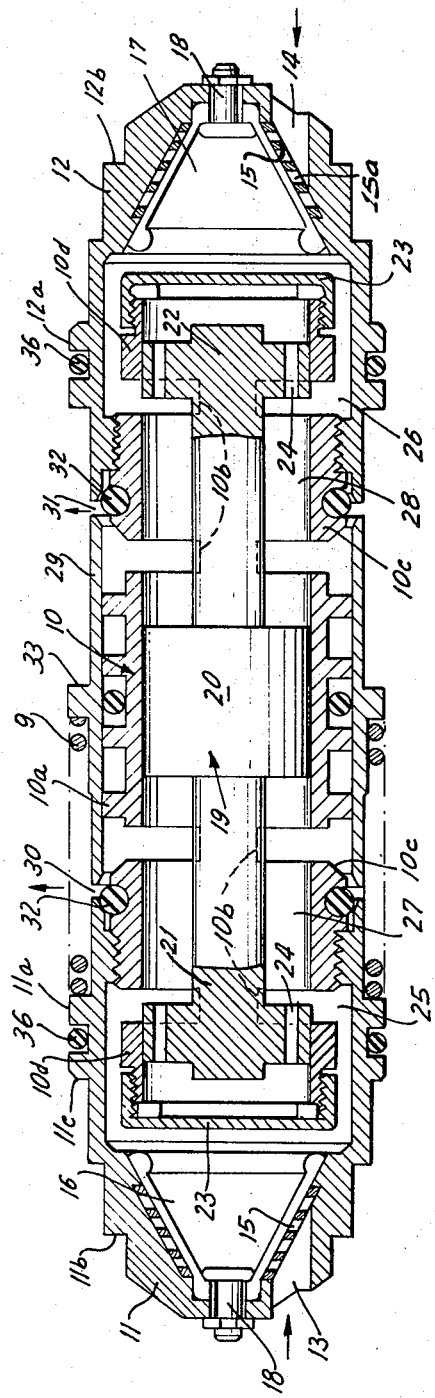
FIG. 1 is an axial sectional view illustrating a mixer valve unit according to the invention.

The thermostat casing has an abutment member 6c formed with a bearing surface in which a projecting fulcrum portion 7a of an actuating lever 7 is mounted for angular movement. The upper end of actuating lever 7c abuts a wall portion 2b and is supported by the same for pivotal movement. Abutment member 6c is preferably annular and guided in a bore of a transverse wall portion 2c. Two actuating levers 7 may be provided opposite sides of the thermostat casing 6. The actuating lever means 7 has free ends abutting an annular flange 33 on a tubular valve member 29 which is best seen in FIG. 1. A coil spring 9 abuts flange 33 and urges the tubular valve member 29 to the right as viewed in the drawing and into engagement with the free ends of lever means 7. When the thermostat casing 6 expands, actuating lever means 7 are turned about the seats in wall portion 2c so that valve member 29 is displaced to the left as viewed in the drawing, against the action of spring 9, and when thermostat casing 6 contracts spring 9 moves valve member 29 to the right.

The tubular valve member 29 is mounted on annular ribs of a central cylinder portion 10a which is connected by bridge portions 10b to two cylinder portions 10c of the cylinder member 10a, 10b, 10c. Cylinder portions 10c have threaded end portions to which end caps 11 and 12 are threaded. Sealing rings 32 are mounted in annular grooves of cylinder portions 10c adjacent the annular edges of end caps 11 and 12 which are located opposite the annular edges of the tubular valve member 29 and form outlets 30 and 31 for hot and cold water with the same. When valve member 29 is moved under the control of the thermostat means 6, 7 to the left, the annular hot water outlet 30 is gradually closed, and when the mixed water around thermostat 6 becomes cooler and the same contracts, valve member 29 is moved to the right by the actuating lever means 7 to gradually reduce and close the annular cold water outlet 31 of the mixer valve unit. The end caps 11 and 12 have inlets 13 and 14 for hot and cold water located in the region of the inlet ports 3 and 4 of the housing 2, as shown in FIG. 2. Frustoconical members 15 have spiral shaped slots 15a for guiding the water around check valves 16 and 17 which are frustoconical soft rubber members having a neck portion secured by a bolt and nut means 18 to caps 11 and 12. The pressure of hot and cold water entering through inlets 13 and 14 moves the frustoconical check valve members 16 and 17 away from the slots 15 so that water can enter into the interior of caps 11 and 12 and further flow into the interior of cylinder portions 10c and 10a via spaces between cylinder portion 10c and cylinder portions 10a, permitting hot and cold water, respectively, to flow through the outlets 30 and 31.

Equalizing piston means 19 include a supporting and separating piston 20 sliding in the cylinder portion 10a, a pair of piston rods, and control pistons 21 and 22 at the ends of the piston rods. In order to avoid oscillations of the equalizing piston means 19 upon the occurrence of sudden pressure fluctuations, the cylinder portions 10d are closed by inner closure members 23 forming cylinder spaces communicating through circular rings of bores 24 in control pistons 21 and 22 with the interior of cylinder portions 10a, 10c, and of caps 11 and 12. The thin bores 24 have a throttling effect and prevent rapid movements of the equalizing piston means 19 in the cylinder means 10. Increase of the pressure on one side of the separating piston 20 will cause displacement of the piston means 19 toward the other side, and the control piston 21 or 22 on the side where the pressure is increased is moved to reduce or close the annular space 25 or 26 through which water from inlet 13 or 14 flows into the inner chambers 27 or 28 of cylinder portions 10c toward the annular outlets 30, 31. When a control piston 21 or 22 enters the respective associated cylinder portion 10c, communication between the respective inlets 13 or 14 and the outlets 30 or 31 is possible only through the bores 24.

The cylinder means 10, 11, 12, and more particularly the caps 11 and 12 have circular outer sealing slide surfaces 11a and 12a which respectively match inner circular sealing and mounting surfaces 34, 35 in housing 2 which form a guide way for the mixer valve unit. Each slide surface 11a, 12a has a circular groove in which a sealing ring 36 is mounted to engage the respective surface 34 or 35. The mounting surface 34 is bounded by an inner annular flange 34a abutting a shoulder 11c of cap 11 in the inserted position of the mixer valve unit 1. Sealing rings 36 assure that no communication takes place between the inlet ports 3 and 4, and the cavity in the housing in which the thermostat 6 is located so that hot and cold water can flow only through the mixer valve unit 1 and its outlets 30 and 31 toward the outlet port 5.

Caps 11 and 12 have annular shoulders 11b and 12b on which tubular sieves or meshes 39 are mounted by which the inlets 13 and 14 are protected so that foreign particles cannot enter the mixer valve unit. Cover plugs 37, 38 are threaded into assembly openings of casing 2 and have annular shoulders abutting the ends of the tubular sieves 39 to hold the same in place. The pressure transmitted from plug 38 to cylinder means 12, 10, 11, holds the annular shoulder 11c in abutment with the inner flange 34a in a position in which one end of a single actuating lever, or the two ends of two actuating levers 7 abut pressure points 8 of the annular shoulder 33 on valve member 29.

The assembly opening 38a in the housing has a greater diameter than the widest part of the mixer valve unit and registers in longitudinal direction with the guide way formed by the inner mounting and sealing surfaces 34, 35, so that upon removal of the closure plug 38, the entire mixer valve unit can be removed through openings 38, and replaced after servicing.

During operation hot and cold water enters through inlet ports 3 and 4, flows through inlets 13 and 14 into the interior of the cylinder means 10, 11, 12, and through annular outlets 30 and 31 into the mixing chamber in the upper portion of housing 2 in which thermostat 6 is located. The thermostat expands or contracts in accordance with the temperature of the mixed water so that abutment 6c displaces the actuating means 7 and thereby the tubular valve member 29 to reduce the flow cross section of one of the outlets 30, 31 while increasing the flow cross section of the other. In this manner the temperature of the mixed water is automatically regulated. Sudden pressure fluctuations of the hot or cold water are compensated by movements of the equalizing piston means 19 which permits more or less hot or cold water to flow from the respective inlet 13 or 14 in the interior of the cylinder means 10 toward the outlets 30 and 31, since pistons 21 and 22 reduce or increase the free flow cross sections of the spaces 25 and 26.

In accordance with the invention all parts required for controlling the flow of hot and cold water, namely movable valve member, cylinder means, equalizing piston means, check valves are combined in a tubular unit which can be inserted as a whole into the casing of a mixing faucet and secured in the same by operation of cover plug 38. The insertion or removal of the mixer valve unit can be carried out entirely independently of the thermostat which remains in the casing, and the construction of the mixer valve unit permits even rough handling without any damage to its parts. If any malfunction of the mixer valve unit occurs, it can be easily removed and repaired or replaced by another identical unit.

Evidently, instead of the described thermostat 6, a bimetal thermostat, or any other thermostat can be used. The temperature is in any event exactly maintained since pressure fluctuations are compensated by the equalizing piston means 19.

The illustrated embodiment is a mixing faucet through which water continuously flows. The inlet ports 3 and 4 can be provided with closure valves which are simultaneously opened and closed.

It will be understood that each of the elements described above, or two or more together, may also find a useful application in other types of thermostat controlled mixing faucets differing from the types described above.

While the invention has been illustrated and described as embodied in a mixer valve unit which is inserted as a whole into the casing of a mixing faucet, and can be removed as a whole by opening of a cover plug, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention.

I claim:

1. Thermostat controlled mixing faucet comprising housing means forming a mixing chamber having an outlet port, said housing means having first and second inlet ports for hot and cold water, an assembly opening, and cover means for closing and opening said assembly opening; thermostat means located in said mixing chamber and including actuating means responsive to the temperature of the water in said mixing chamber; mounting means in said housing means forming a guideway aligned with said assembly opening in one direction; and an elongated mixer valve unit extending in said one direction and having first and second inlet means communicating with said first and second inlet ports, respectively, outlet means communicating through said mixing chamber with said outlet port, and a movable valve means connected with and operated by said actuating means for regulating the relative amounts of hot and cold water flowing out of said outlet means into said mixing chamber and out of said outlet port, said mixer valve unit having transverse to said one direction a cross section smaller than the open cross section of said assembly opening and being mounted in said guideway for free longitudinal movement in said one direction along the same independently of said thermostat means and through said assembly opening out of and back into said housing means when said cover means is detached from said assembly opening.

2. A mixing faucet as claimed in claim 1 wherein said mixer valve unit includes cylinder means composed of a central cylinder portion, and end caps secured to the ends of said central cylinder portion.

3. A mixing faucet as claimed in claim 2, wherein said valve means of said mixer valve unit includes a tubular valve member mounted on said central cylinder portion for movement in axial direction; and wherein said outlet means of said mixer valve unit include two outlets located in said central cylinder portion and adapted to be closed and opened by said valve member.

4. A mixing faucet as claimed is claim 2 wherein said central cylinder portion includes three parts forming between each other two spaces communicating with said outlets, respectively, and wherein said first and second inlet means are parts of said cap portions.

5. A mixing faucet as claimed in claim 4 wherein said mixer valve unit includes sealing rings mounted on said central cylinder portions, respectively, adjacent the inner ends of said cap portions and the ends of said valve member.

6. A mixing faucet as claimed in claim 1 wherein said mixer valve unit includes cylinder means having end portions; wherein said first and second inlet means are parts of said end portions and include a frustoconical surface having a spiral groove, and frustoconical check valve means consisting of rubber.

7. A mixing faucet as claimed in claim 1 wherein said mixer valve unit includes cylinder means having circular slide faces; wherein said mounting means includes circular mounting faces slidingly engaging said circular slide faces; and wherein said cover means includes at least one plug closing said opening.

8. Thermostat controlled mixing faucet, comprising housing means having two inner annular sealing surfaces spaced from each other and forming a guide way extending in one direction, first and second inlet ports for hot and cold water located outward of said annular sealing surfaces, an assembly opening located at at least one end of said guide way registering with the same in said one direction, cover means for the same, a mixing chamber communicating with the space between said annular sealing surfaces, and an outlet port communicating with said mixing chamber; thermostat means located in said mixing chamber and including actuating means responsive to the temperature of mixed water in said mixing chamber, said actuating means projecting into the space between said annular sealing surfaces; and a mixer valve unit having outer annular sealing surfaces in sealing contact with said inner annular sealing surfaces, said mixer valve unit having first and second inlet means located outward of said annular sealing surfaces in said one direction, respectively, and communicating with said inlet ports, respectively, outlet means between said outer annular sealing surfaces communicating with the space between the same and with said mixing chamber, and movable control valve means connected with and operated by said actuating means for regulating the relative amounts of hot and cold water flowing from said inlet ports and inlet means through said outlet means and mixing chamber to said outlet port; said mixer valve unit being slidable in said one direction along said guide way for removal and insertion independently of said thermostat means through said assembly opening when said cover means is opened.

9. A mixing faucet as claimed in claim 8 wherein said housing means has another assembly opening and cover means for the same, said other assembly opening being located at the other end of said guide way registering with the same in said one direction so that said mixer valve unit is accessible through both said assembly openings.

10. A mixing faucet as claimed in claim 9 wherein both said cover means are threaded plugs threaded into said assembly openings for engaging the ends of said mixer valve unit so that the same cannot move in said one direction along said guide way until at least one of said plugs is removed.

11. A mixing faucet as claimed in claim 8 wherein said housing means has mounting means movably mounting said thermostat means, an aperture for the removal and insertion of said thermostat means, and a cap for closing said aperture.

12. A mixing faucet as claimed in claim 8 wherein said mixer valve unit includes cylinder means, and equalizing piston means mounted in said cylinder means; and wherein said first and second inlet means communicate with the interior of said cylinder means so that pressure fluctuations cause displacement of said equalizing piston means and wherein said outlet means includes first and second outlets respectively communicating with said first and second inlet means through the interior of said cylinder means; and wherein said equalizing piston means cooperates with said cylinder means to throttle the flow between said first and second inlet means and said first and second outlet to equalize pressure fluctuations.

13. A mixing faucet as claimed in claim 8 wherein said outer sealing surfaces are formed with annular grooves, and wherein said mixer valve unit includes circular sealing rings located in said grooves of said outer sealing surfaces.

14. A mixing faucet as claimed in claim 13, and including tubular sieves surrounding said first and second inlet means of said mixer valve unit.